(12) United States Patent
Maltais et al.

(10) Patent No.: US 7,647,996 B2
(45) Date of Patent: Jan. 19, 2010

(54) ALL-TERRAIN VEHICLE

(75) Inventors: Hugues Maltais, Valcourt (CA); Simon Constantineau, Mont-Laurier (CA); Claude Gagnon, Magog (CA); David Belzile, Granby (CA)

(73) Assignee: Bombardier Recreational Products Inc., Valcourt (CA)

( * ) Notice: Subject to any disclaimer, the term of this patent is extended or adjusted under 35 U.S.C. 154(b) by 111 days.

(21) Appl. No.: 11/813,130

(22) PCT Filed: Apr. 11, 2006

(86) PCT No.: PCT/US2006/013373

§ 371 (c)(1),
(2), (4) Date: Jun. 29, 2007

(87) PCT Pub. No.: WO2006/110687

PCT Pub. Date: Oct. 19, 2006

(65) Prior Publication Data

US 2008/0217081 A1 Sep. 11, 2008

Related U.S. Application Data

(60) Provisional application No. 60/669,929, filed on Apr. 11, 2005.

(51) Int. Cl.
*B62D 23/00* (2006.01)
(52) U.S. Cl. .................... 180/89.1; 180/312
(58) Field of Classification Search ............ 180/89.1, 180/90.6, 311, 312, 908
See application file for complete search history.

(56) References Cited

U.S. PATENT DOCUMENTS

| 3,099,326 | A | * | 7/1963 | Weigel et al. | 180/214 |
| 3,561,556 | A | * | 2/1971 | Davies, III | 180/54.1 |
| 4,664,208 | A | * | 5/1987 | Horiuchi et al. | 180/23 |
| 4,781,258 | A | * | 11/1988 | Tamura | 180/68.1 |
| 5,076,387 | A | | 12/1991 | Oka et al. | |
| 5,083,632 | A | | 1/1992 | Saito et al. | |
| 5,740,878 | A | * | 4/1998 | Sala | 180/291 |
| 6,296,163 | B1 | * | 10/2001 | Kitao et al. | 224/401 |
| 6,340,186 | B2 | * | 1/2002 | Johnson et al. | 293/120 |

(Continued)

FOREIGN PATENT DOCUMENTS

| FR | 2820709 A | 8/2002 |
| JP | 2005053461 A | 3/2005 |
| WO | 9618526 A | 6/1996 |

OTHER PUBLICATIONS

Japanese abstract of JP2005053461.
International Search Report, dated Oct. 5, 2006, Grunfeld, Michael.

*Primary Examiner*—Paul N Dickson
*Assistant Examiner*—Robert A Coker
(74) *Attorney, Agent, or Firm*—Osler, Hoskin & Harcourt LLP

(57) ABSTRACT

An all-terrain vehicle comprising a rear platform between the rear wheels providing standing room and access to the straddle seat of the all-terrain vehicle. The all-terrain vehicle may also featuring a rear passageway and a side passageway for the rider of the all-terrain vehicle to access to the straddle seat. The all-terrain vehicle also features rear wheel track which is smaller than the front wheel track.

15 Claims, 14 Drawing Sheets

U.S. PATENT DOCUMENTS

| | | |
|---|---|---|
| 6,439,444 B1 | 8/2002 | Shields, II |
| 2004/0031639 A1* | 2/2004 | Deves et al. ................ 180/311 |
| 2004/0031640 A1* | 2/2004 | Tweet ......................... 180/311 |
| 2006/0042844 A1* | 3/2006 | Kirkpatrick et al. ........ 180/65.2 |

* cited by examiner

ALL-TERRAIN VEHICLE

CROSS REFERENCES TO RELATED APPLICATIONS

The present Utility Patent Application is the United States National Stage of International Patent Application No. PCT/US2006/013373 filed Apr. 11, 2006. Through the '373 application, this application claims the benefit of priority to U.S. Provisional Application No. 60/669,929 filed Apr. 11, 2005, the content of which is incorporated herein by reference.

FIELD OF THE INVENTION

The present invention relates to All-Terrain Vehicles.

BACKGROUND OF THE INVENTION

All-Terrain Vehicles (ATV's) are designed to be able to manoeuvre off-road and typically in rough and uneven terrain such as rocky areas, wooded areas, wetlands and sand dunes or beaches. One of the features which typical enables an ATV to handle these varied terrains is the use of large low pressure tires at the front and rear of the ATV. Large low pressure tires provide sizeable surface areas to allow the ATV to progress on very soft terrains such as mud and provide added grip on difficult terrains. Large low pressure tires also attempt provide an increased level of absorption of shocks and impacts thereby adding to the comfort level of the rider and/or passenger in some cases.

Another important feature of a typical ATV which allows it to handle multiple environments is its compactness. ATV's typically feature narrow wheeltracks and short wheelbases enabling them to manoeuvre in dense wooded area and through tight passageways.

The combination of a narrow wheeltrack and short wheelbase with large low pressure balloon-type tires considerably restricts the layout options of the mechanical components of the ATV as well as the leg room of the rider and/or passenger on a two person vehicle. FIGS. 13 and 14 illustrate the bodywork of an existing ATV. The driver's legs are accommodated on each side of the straddle-type seat with his feet resting on foot pegs or short platforms both being restricted to a small area between the front tires and the rear tires. The large rear tires, the rear suspension components and the rear drive train components leave little or no room to provide more leg room and footrest area behind the front portion of the rear tires or ahead of the rear portion of the front tires. As illustrated in FIGS. 13 and 14, ATV's typically comprise large rear fenders covering and separating the rear wheels from the driver's and passenger's legs on a two-person vehicle. These fenders usually extend to the seat to completely isolate the rear wheels and drive train from the occupants, thereby closing the entire space behind the front portion of the rear wheels. The rear fenders are often an integral part of the bodywork of the ATV to achieve an aesthetically pleasing design.

One drawback of an ATV configuration where the rear end of the vehicle is not accessible is that the footrest area is limited to a small space located between the front and rear wheels. The rider's ability to shift his weight is restricted to movements of his upper body with his feet remaining in basically the same position. When seated, the rider can affect the center of gravity of the ATV generally only through movements of his torso. When standing on the footrests, the rider can affect the center of gravity of the ATV through movements of his pelvis and torso but generally only within the bounds imposed by the footrests' limited areas. The rider can affect the center of gravity of the ATV by removing one foot or both feet from the footrests and resting his knee or knees directly on the straddle-type seat however this is obviously an unstable and ultimately unsafe stance it may lead to injuries.

Another drawback of a prior art ATV configuration with large tires comprising rear wheel fenders and bodywork extending over the entire rear suspension and drive train, closing the entire volume between the rear wheels and under the straddle-type seat is that the access to the seat of the ATV is limited to the sides of the ATV. The driver and/or the passenger on a two-person vehicle, can only mount the ATV by raising one leg over the seat in order to sit in a straddled position on the vehicle. It is difficult to mount the ATV any other way as there is limited access from the rear due to the rear wheel fenders and bodywork and no access from the front due to the handlebars.

Therefore, there is a need for an improved ATV to alleviate some of the drawbacks of prior art ATV.

STATEMENT OF THE INVENTION

One aspect of some embodiments of the present invention is to provide an ATV having a increased area to position the feet of the rider.

Another aspect of some embodiments of the present invention is to provide an ATV having at least one passageway providing access to the seat from the rear end of the ATV.

Another aspect of some embodiments of the present invention to provide an ATV having at least one standing platform.

Another aspect of some embodiments of the present invention to provide an ATV having at least one rear platform extending over at least a portion of the rear axle between the rear left wheel and the rear right wheel.

Another aspect of some embodiments of the present invention to provide an ATV having a rear platform including a clearance gap for the rear suspension of the ATV.

Another aspect of some embodiments of the present invention to provide an ATV having a unitary platform extending behind the rear axis of the ATV.

Another aspect of some embodiments of the present invention to provide an ATV having a unitary platform extending behind and in front of the rear axis of the ATV.

Another aspect of some embodiments of the present invention to provide an ATV having a rear platform mounted to the frame and therefore part of the suspended mass of the ATV.

Another aspect of some embodiments of the present invention to provide an ATV having a rear platform mounted to the rear suspension and therefore part of the unsprung mass of the ATV.

Another aspect of some embodiments of the present invention to provide an ATV having multiple passageways to access the straddle seat of the vehicle.

Another aspect of some embodiments of the present invention to provide an ATV having narrow all-terrain tires.

Another aspect of some embodiments of the present invention to provide an ATV having a rear wheel track that is smaller than the front wheel track.

Additional and/or alternative objects, features, aspects and advantages of the embodiments of the present invention will become apparent from the following description, the accompanying drawings and the appended claims.

BRIEF DESCRIPTION OF THE DRAWINGS

For a better understanding of the present invention as well as other objects and further features thereof, reference is made to the following description which is to be used in conjunction with the accompanying drawings, where.

DESCRIPTION OF PREFERRED EMBODIMENT(S)

Figure 1:
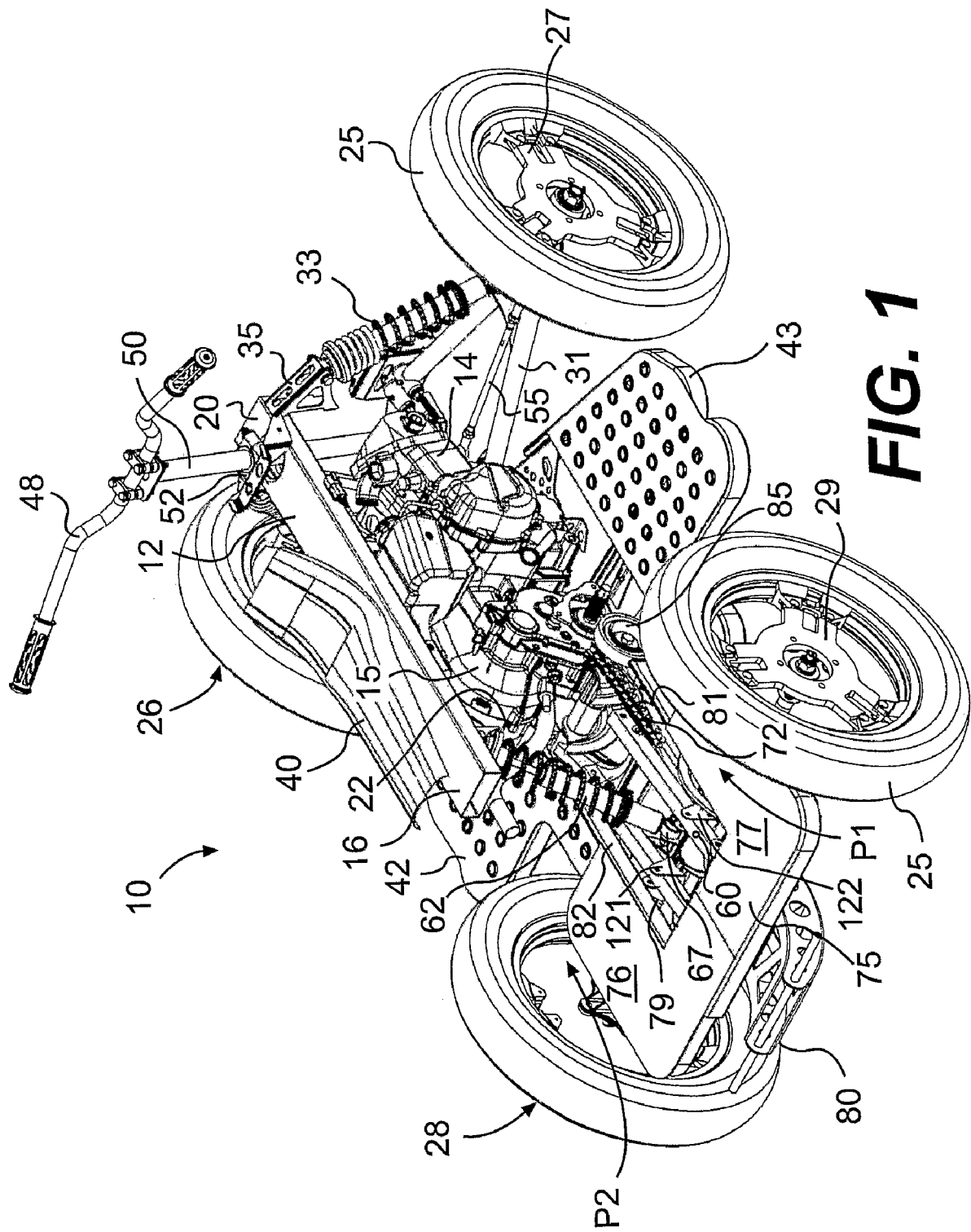
FIG. 1 is a rear perspective view of an all-terrain vehicle in accordance with an embodiment of the invention.
Figure 2:
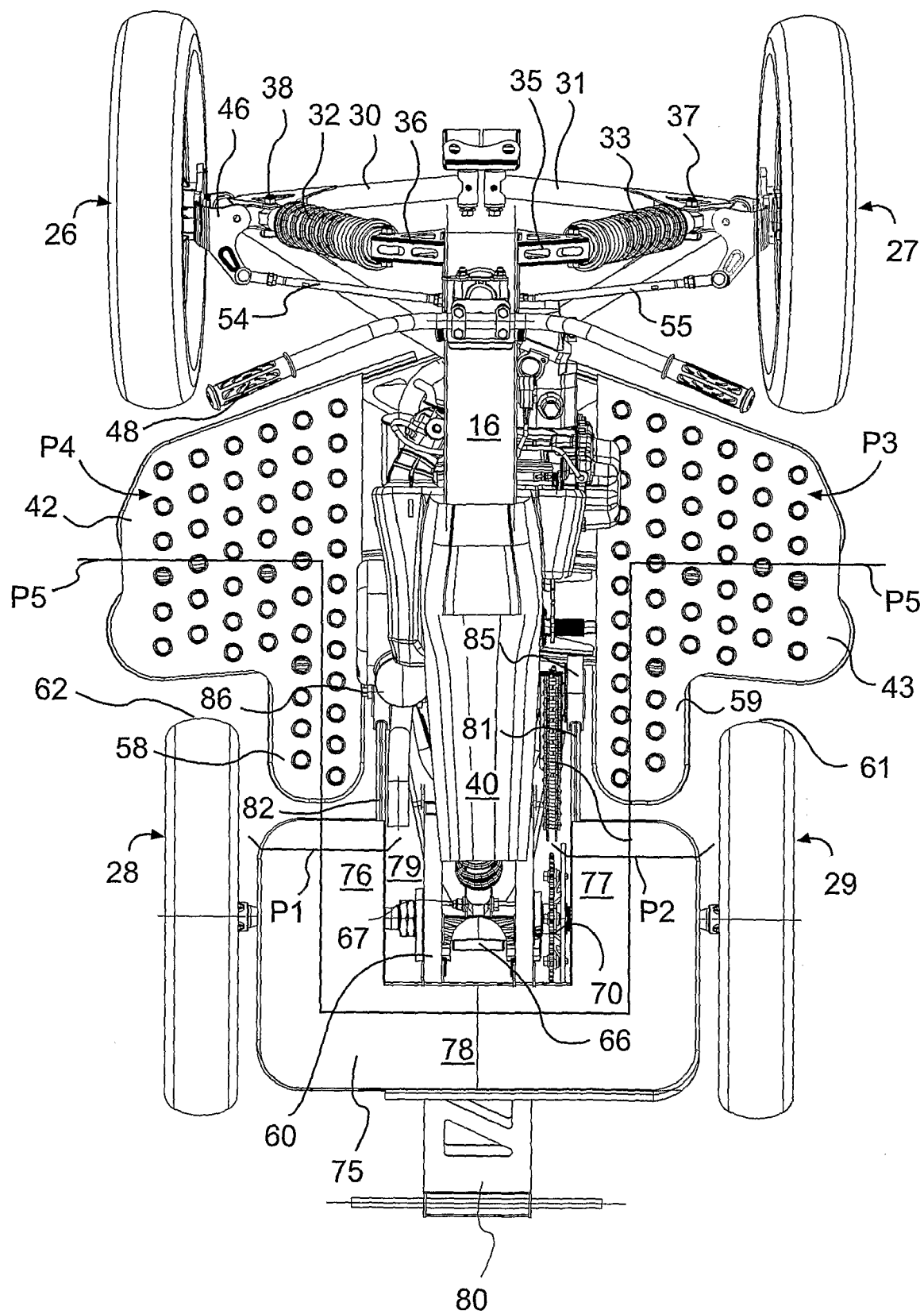
FIG. 2 is a top plan view of the all-terrain vehicle illustrated in FIG. 1.

FIGS. 1 and 2 illustrate an ATV 10 in accordance with one specific embodiment of the invention. The ATV 10 includes a frame 12 that supports and houses an internal combustion engine 14 and a transmission 15. Frame 12 includes an upper member 16 and a lower member 18 extending along the longitudinal axis of ATV 10. The upper member 16 and a lower member 18 are connected together by front and rear cross members 20 and 22 thereby defining a space 24 for housing, supporting and protecting the engine-transmission assembly 14-15.

Figure 4:
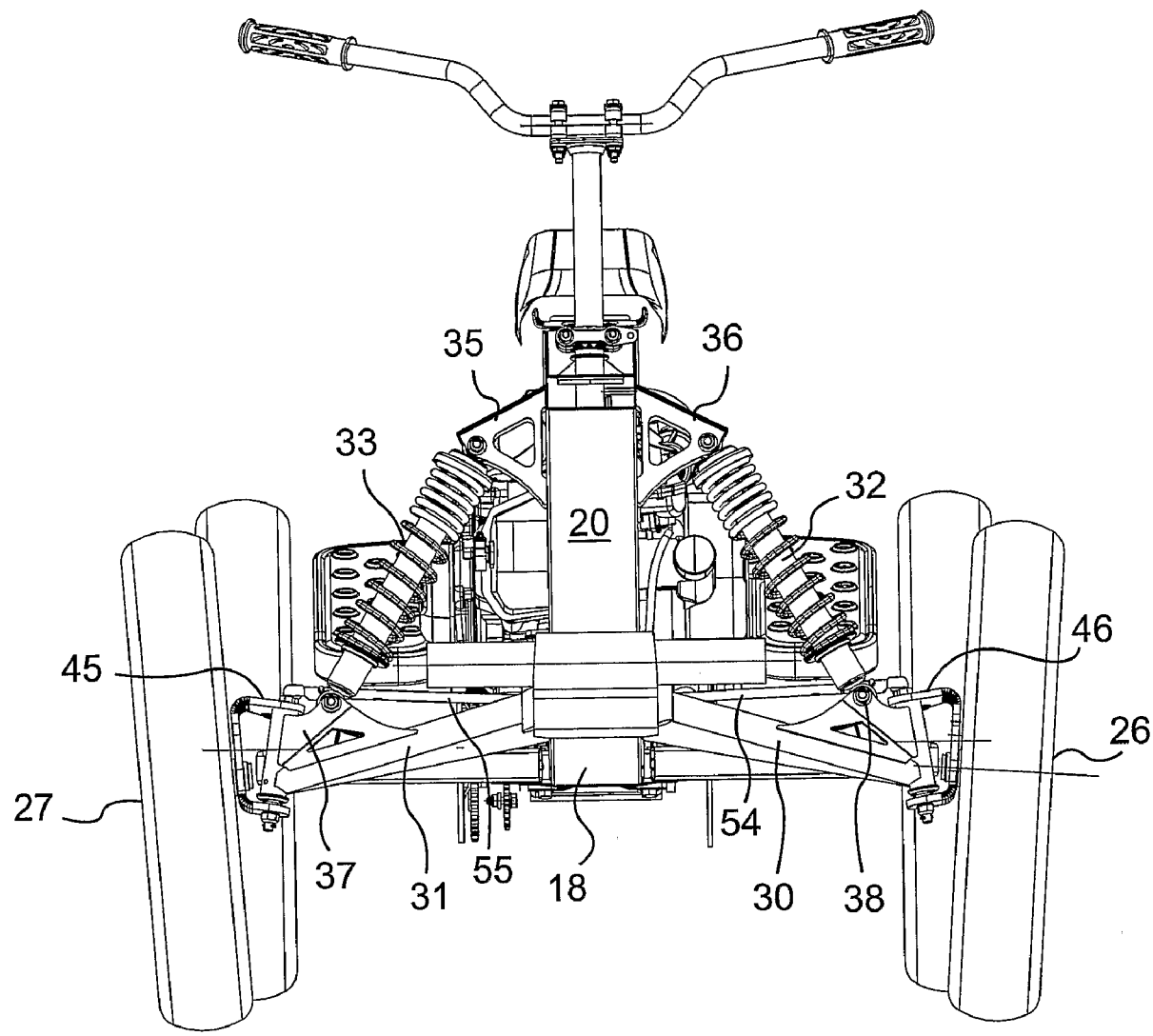
FIG. 4a is front elevational view of the all-terrain vehicle illustrated in FIGS. 1 to 3.
Figure 5:
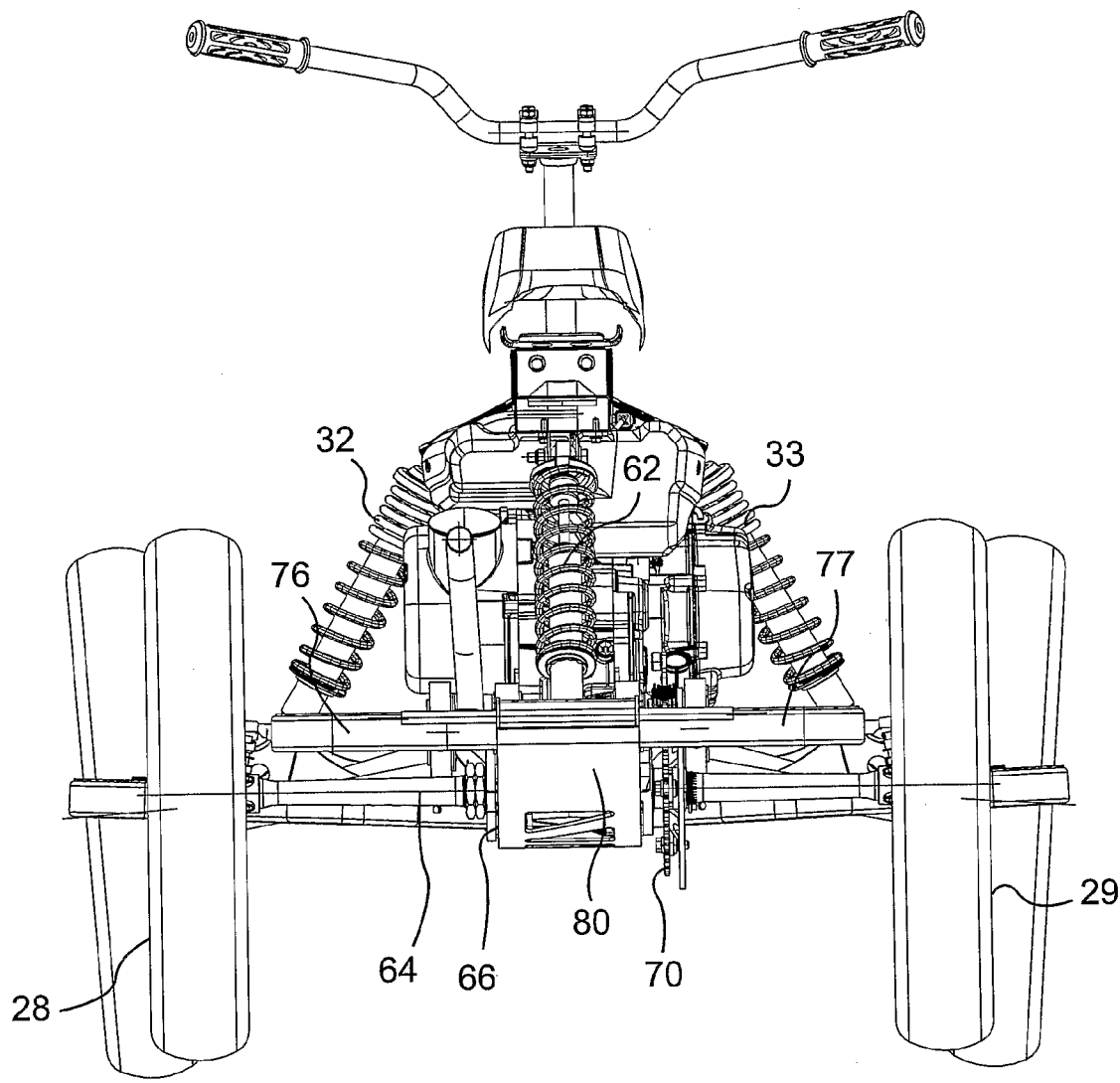
FIG. 5 is a rear elevational view of the all-terrain vehicle illustrated in FIGS. 1 to 4.

The ATV 10 includes a pair of front wheel assemblies 26, 27 and a pair of rear wheel assemblies 28, 29. The pair of front wheel assemblies 26, 27 are connected to the front portion of frame 12 via a front suspension system disposed on both sides of frame 12. The front suspension system includes left and right A-arms 30 and 31 pivotally mounted to the lower member 18 (best shown in FIG. 4) of frame 12 and shock absorber/coil spring assemblies 32, 33. The shock absorber/coil spring assemblies 32, 33 connect the respective A-arm 30 and 31 to the upper portion of frame 12 to control and dampen movement of A-arms 30 and 31 relative to frame 12. Shock absorber/coil spring assemblies 32, 33 are mounted at their upper ends to upper brackets 35, 36 affixed to the front cross members 20 of the frame 12 and to lower brackets 37, 38 affixed to left and right A-arms 30 and 31, at their lower ends. The front wheel assemblies 26, 27 are pivotally connected to the outward portion of the A-arms 30, 31 via spindle mechanisms 45, 46 which allow the wheel assemblies 26, 27 to rotate and be steered. ATV 10 comprises a steering system which includes a steering member in the form of handlebars 48, a steering column 50 extending downwardly from handlebars 48, through upper member 16 of frame 12 to which it is pivotally mounted and supported by a bearing support 52. Steering column 50 is connected at a lower end to a pair of steering arms 54, 55 connected to the spindle 45, 46 to transfer steering commands of the rider to the front wheel assemblies 26, 27.

A straddle seat 40 is mounted on the upper member 16 of frame 12 and is preferably elongated to provide mobility for the rider or sitting room for a passenger. ATV 10 features a pair of large footrests 42 and 43 affixed to the lower member 18 of frame 12 and extending outwardly between the front wheel assemblies 26, 27 and the rear wheel assemblies 28, 29 thereby filling a substantial portion of the space between the front and rear wheel assemblies 26, 27, 28, 29 and the engine-transmission assembly 14-15. As illustrated in FIG. 2, footrest 42 extends outwardly from frame 12 all the way to, and past the rear left wheel assembly 28 and footrest 43 extends outwardly from frame 12 all the way to, and past the rear right wheel assembly 29. Each footrests 42 and 43 is preferably wider than seat 40. The large footrests 42 and 43 together are wider than the width of the handlebar 48. The forward portions of footrests 42, 43 are slightly angled to provide clearance for the front wheel assemblies 26, 27 to rotate about their steering axes. The footrests 42, 43 further comprise rear portions 58, 59 which extend rearward between the front ends 61, 62 of the rear wheel assemblies 28, 29 and frame 12 thereby providing room to comfortably accommodate the feet of a passenger. Large footrests 42 and 43 provide ample room for the rider to position his feet and legs and adopt a variety of riding positions.

The pair of rear wheel assemblies 28, 29 are connected to the rear portion of frame 12 via a rear suspension system comprising a swing arm 60 pivotally connected to the lower member 18 of frame 12 at pivot points 85, 86 and a single shock absorber/coil spring assembly 62. In this particular embodiment, the rear wheel assemblies 28, 29 of ATV 10 are connected to the swing arm 60 via a rigid axle 64 fastened directly onto both rear wheel assemblies 28, 29. An axle bearing carrier 66 is attached directly to the end of swing arm 60 and is an integral part thereof to provide smooth rotation of the wheel assemblies 28, 29. The single shock absorber/coil spring assembly 62 is pivotally mounted to the upper member 16 of frame 12, below seat 40, and to a bracket 67 positioned near the extremity of swing arm 60 thereby providing dampening of the movements of rigid axle 64 relative to frame 12. Rigid axle 64 includes a rigidly mounted sprocket 70 operatively connected to transmission 15 through an endless chain 72 whereby power is transmitted from engine 14 to the left and right rear wheel assemblies 28, 29 via transmission 15.

Since ATV 10 is designed to be a more nimble vehicle, the wheel assemblies 26, 27, 28, 29 of ATV 10 are equipped with narrow tires 25 similar to those typically used for motocross (which are less than 18 cm, and preferably between 10-15 cm in width), making the ATV 10 more nimble and easily maneuverable than typical large low pressure tires used in existing ATV's. As illustrated more specifically in FIG. 2, the rear wheel track of ATV 10 is narrower or smaller that the front wheel track of ATV 10. This increases the maneuverability and traction of the ATV in rough terrain. ATV 10 is provided with an anti-roll bracket 80 which is rigidly connected the axle bearing carrier 66 and is therefore an extension of swing arm 60. The anti-roll bracket 80 extends past the rear axle of the ATV 10 sufficiently to touch the ground if the front wheels of ATV 10 are raised too high thereby preventing ATV 10 from overturning.

Figure 3:
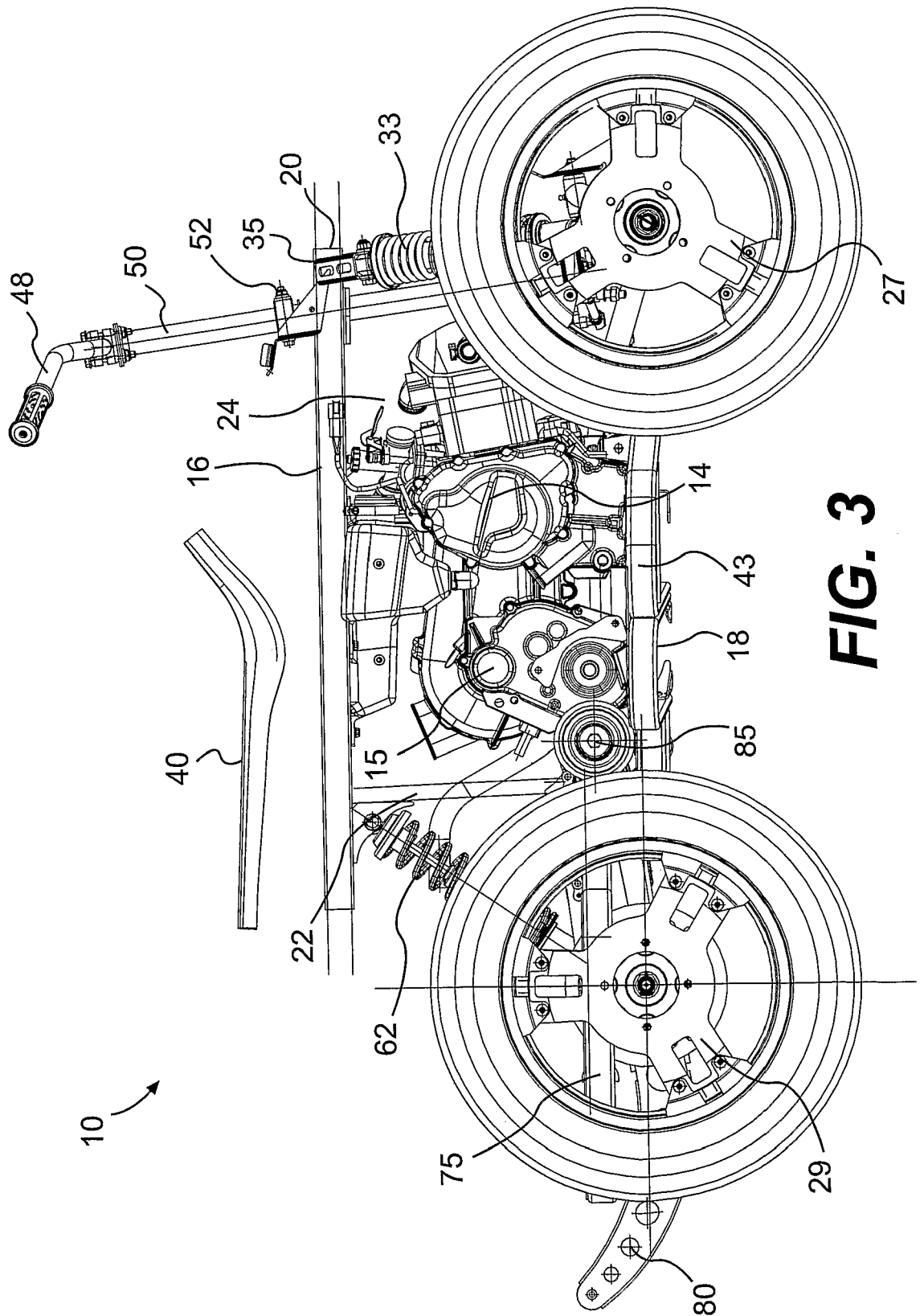
FIG. 3 is a side elevational view of the all-terrain vehicle illustrated in FIGS. 1 and 2.

As illustrated in FIGS. 1 to 3, the configuration of ATV 10, the disposition of the rear suspension and drive train components, and the use of generally narrow tires 25 provide additional room behind seat 40, between rear wheel assemblies 28, 29 relative to existing ATV's. In a first embodiment of the present invention, ATV 10 includes a rear platform 75 positioned directly above rigid axle 64 substantially at the same level as footrests 42 and 43. Rear platform 75 comprises a left portion 76, a right portion 77 and a central portion 78 joining left portion 76 and a right portion 77 yet providing a clearance gap 79 for the single shock absorber/coil spring assembly 62.

Rear platform 75 provides multiple advantages over existing ATV's. First, it provides easy passageways, illustrated by arrows P1 and P2, for the rider or a passenger to access seat 40 through the rear of the vehicle. Passageway P1 is defined in part by the space between seat 40 and rear left wheel assembly 28 whereas passageway P2 is defined in part by the space between seat 40 and rear right wheel assembly 29. The rider or passenger may step on the left portion 76 or the right portion 77 of rear platform 75 and easily straddle seat 40 from the rear through passageways P1, P2. This feature makes it easy to park the ATV 10 in tight areas or to pick up a passenger.

Second, rear platform 75 provides the rider with additional room to position his feet and allow the lone rider to shift his weight and affect the center of gravity of the ATV in ways that are not possible with existing ATV. Rear platform 75 provides an entire new range of positions for the feet of the rider thereby opening new possibilities to manoeuvre the ATV 10. For example, with rear platform 75 extending beyond the rear wheel axis of the vehicle, the rider is able shift his weight behind the rear wheel axis and more easily lift the front wheels of the ATV while pulling on the handlebars 48. The rider may also wish to concentrate his weight directly over the rear wheel axis to obtain better traction between the narrow tires 25 of the rear wheel assemblies 28, 29 and the ground.

Thirdly, rear platform 75 provides a safe standing room for a passenger and ample footrest area for a passenger.

The rider's ability to shift his weight is no longer restricted to movements of his upper body because his feet have ample room to stand on either side of seat 40 as well as behind seat 40. When seated, the rider can affect the center of gravity of the ATV through movements of his torso as well as movements of his legs. When standing up, the rider can affect the center of gravity of the ATV by shifting his entire weight forward on the large footrests 42, 43 or backward onto rear platform 75.

In the particular embodiment illustrated in FIGS. 1-5, rear platform 75 is mounted on a pair of support beams 81, 82 extending from underneath the left and right portions 76, 77 of rear platform 75 to the lower member 18 of frame 12 where support beams 81, 82 are pivotally connected thereto at pivot points 85, 86. The back end of rear platform 75 is mounted either directly onto the swing arm 60 via brackets 121 and 122 or directly affixed to any portion of the swing arm 60. In this configuration, rear platform 75 is therefore part of the unsprung mass of the ATV 10 and interdependent with the movements of the swing arm 60 and rigid axle 64. To reduce vibration, the back end of rear platform 75 is preferably mounted via rubber bushings as is well known in the art.

Figure 6:
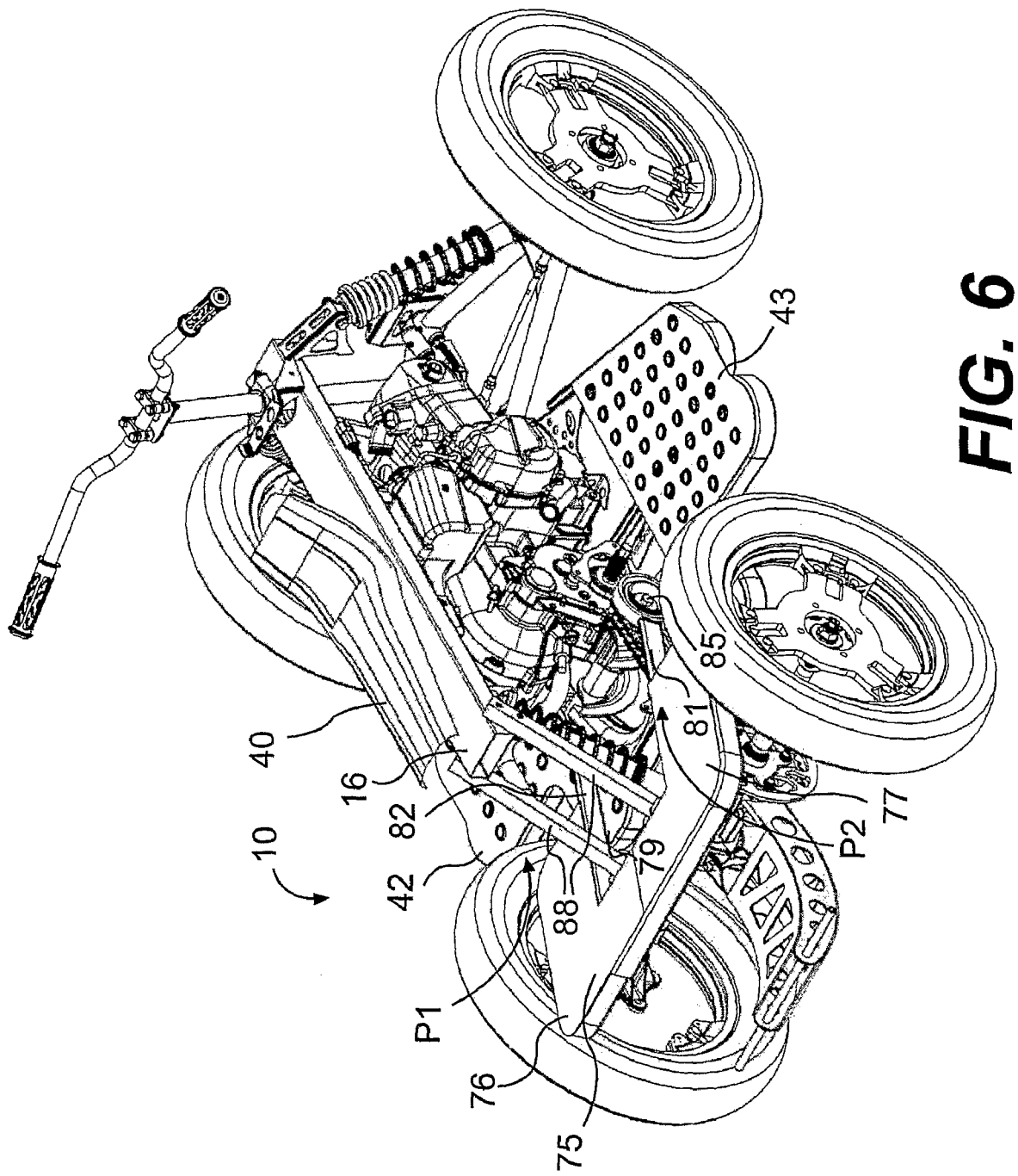
FIG. 6 is a rear perspective view of an all-terrain vehicle in accordance with second embodiment of the invention.
Figure 7:
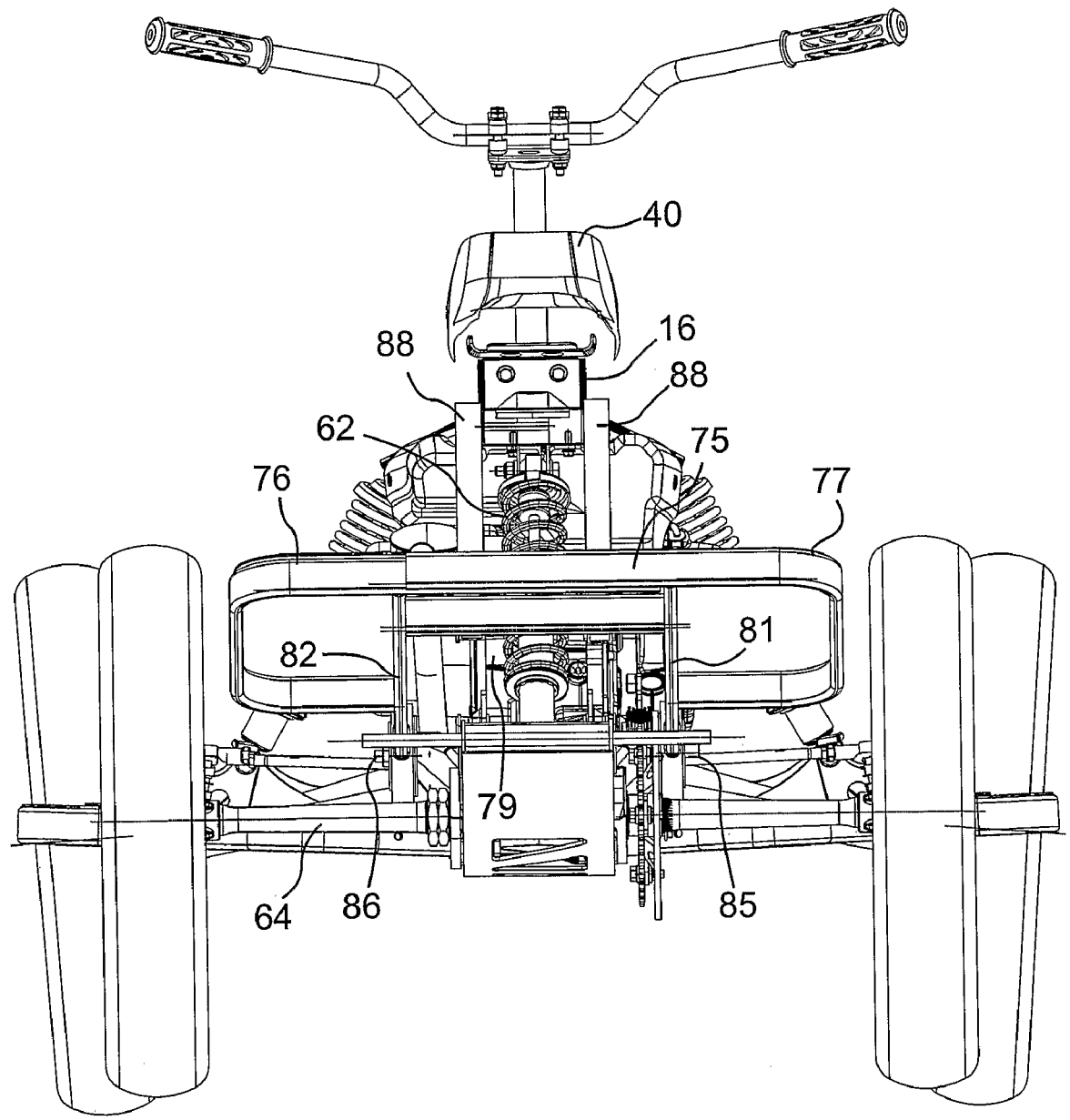
FIG. 7 is a rear elevational view of the all-terrain vehicle illustrated in FIG. 6.

FIGS. 6 and 7 illustrate a second embodiment of the ATV 10 in which the rear platform 75 is secured to the upper member 16 of frame 12 via members 88. Obviously, other means of rigidly mounting rear platform 75 to the upper portion of frame 12 are contemplated and well within the scope of the invention. Being affixed to the upper member 16 of frame 12, rear platform 75 becomes part of the sprung mass of the ATV 10 and is therefore independent of the movements of the swing arm 60 and the rear suspension in general.

Figure 10:
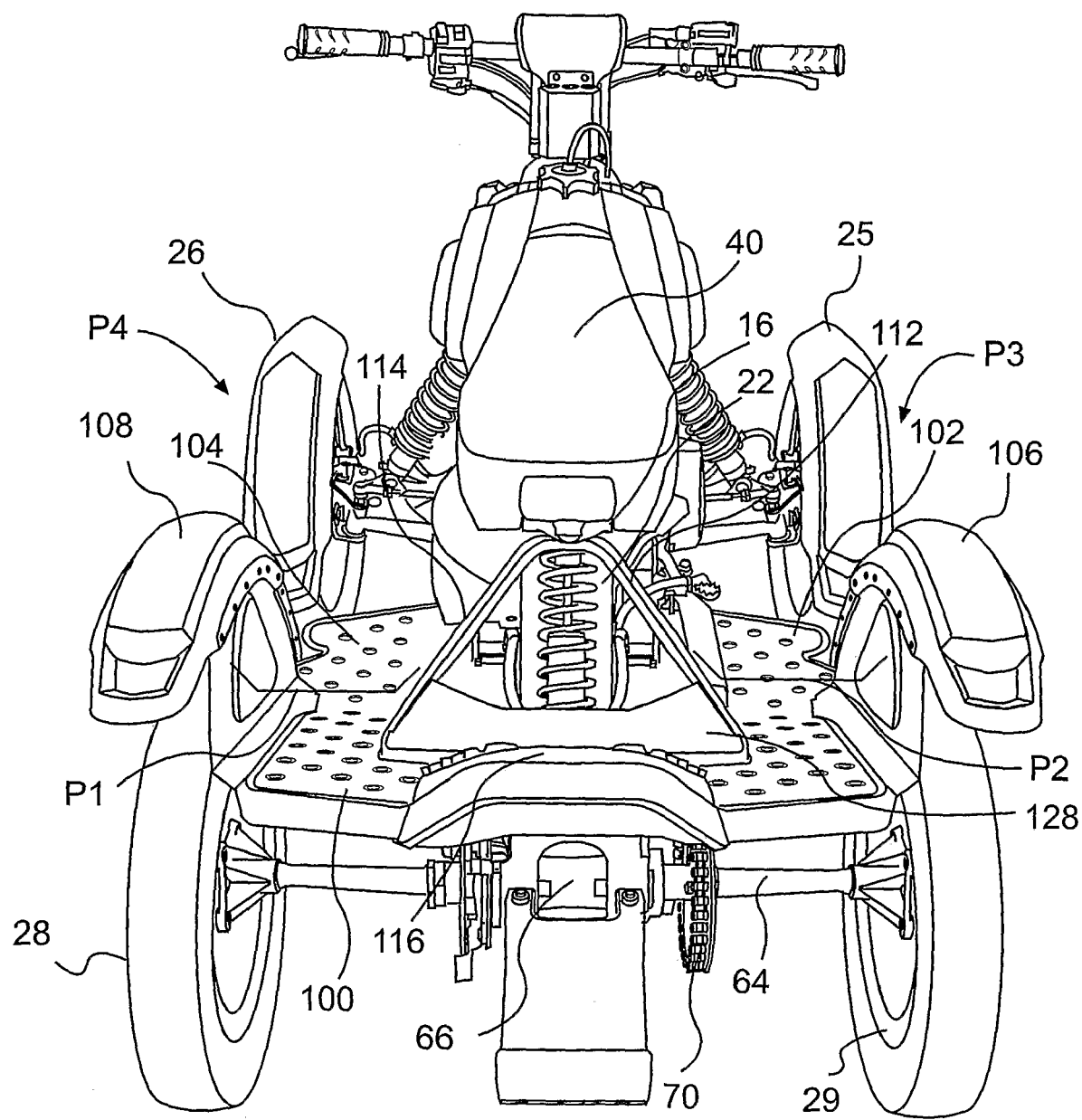
FIG. 10 is a rear view of the all-terrain vehicle in accordance with a fourth embodiment of the invention.

Although rear platform 75 is pivotally connected to the lower member 18 of frame 12 at pivot points 85, 86, it will not move relative to frame 12 and seat 40 as the two anchoring points, namely, the upper member 16 and the lower member 18 of frame 12 do not move relative to each other. As illustrated, rear platform 75 is preferably provided with a clearance space 79 to accommodate the single shock absorber/coil spring assembly 62. In the embodiment illustrated in FIGS. 6 and 7, rear platform 75 is raised at a slight angle to prevent any interference with the movements of the swing arm 60 and rigid axle 64. Rear platform 75 could also be configured with a frontal lower level and an rear upper level positioned over the rigid axle 64 to prevent interference with the movements of the swing arm 60 and rigid axle 64. As illustrated in FIG. 10, fenders covering the upper portions of rear wheel assemblies 28, 29 and the side portions of rear wheel assemblies 28, 29 may be connected to rear platform 75 of both embodiments described above, to prevent any contact between the feet or legs of the rider or passenger and the rear wheel assemblies 28, 29.

Figure 8:
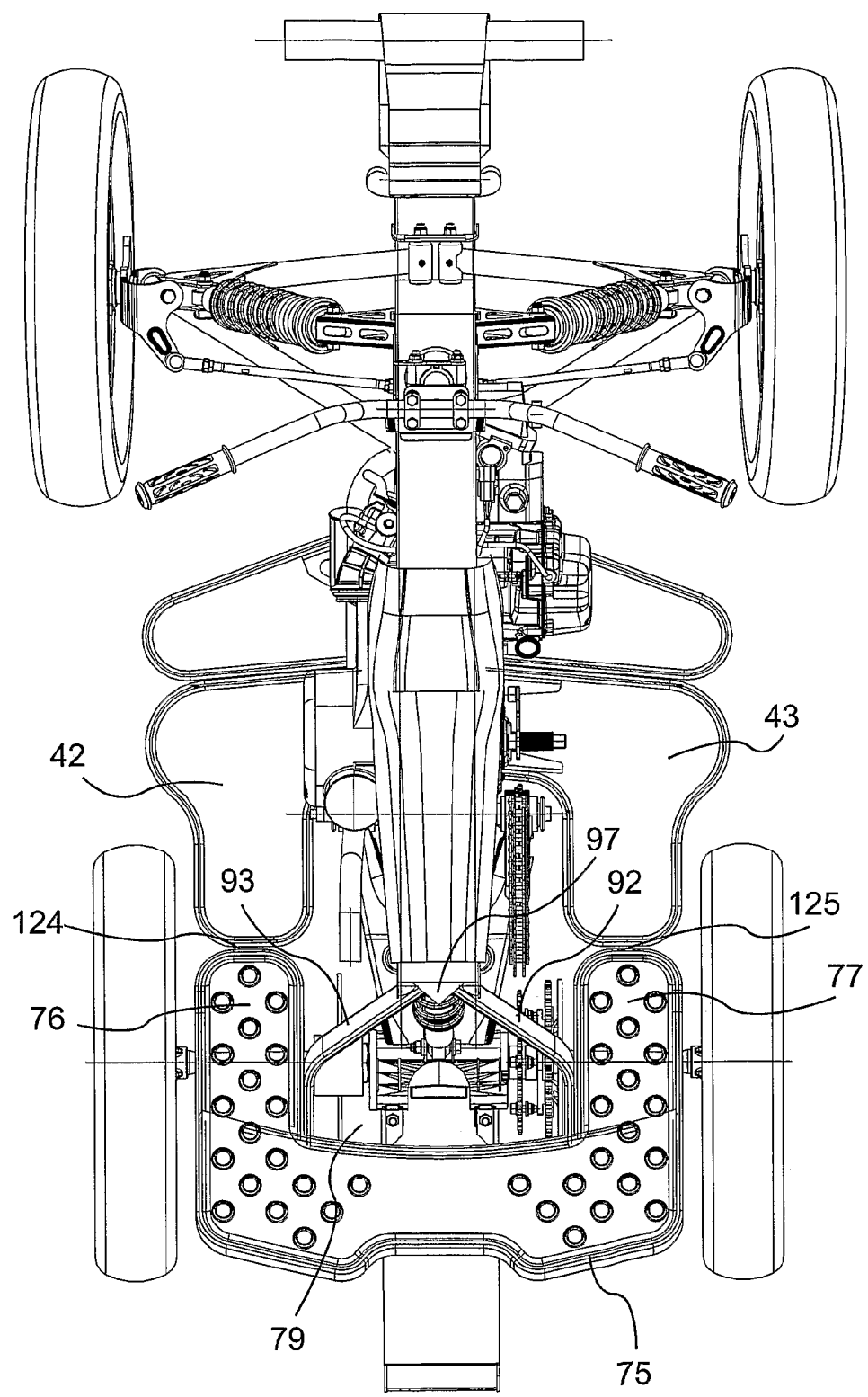
FIG. 8 is a top plan view of the all-terrain vehicle in accordance with third embodiment of the invention.
Figure 9:
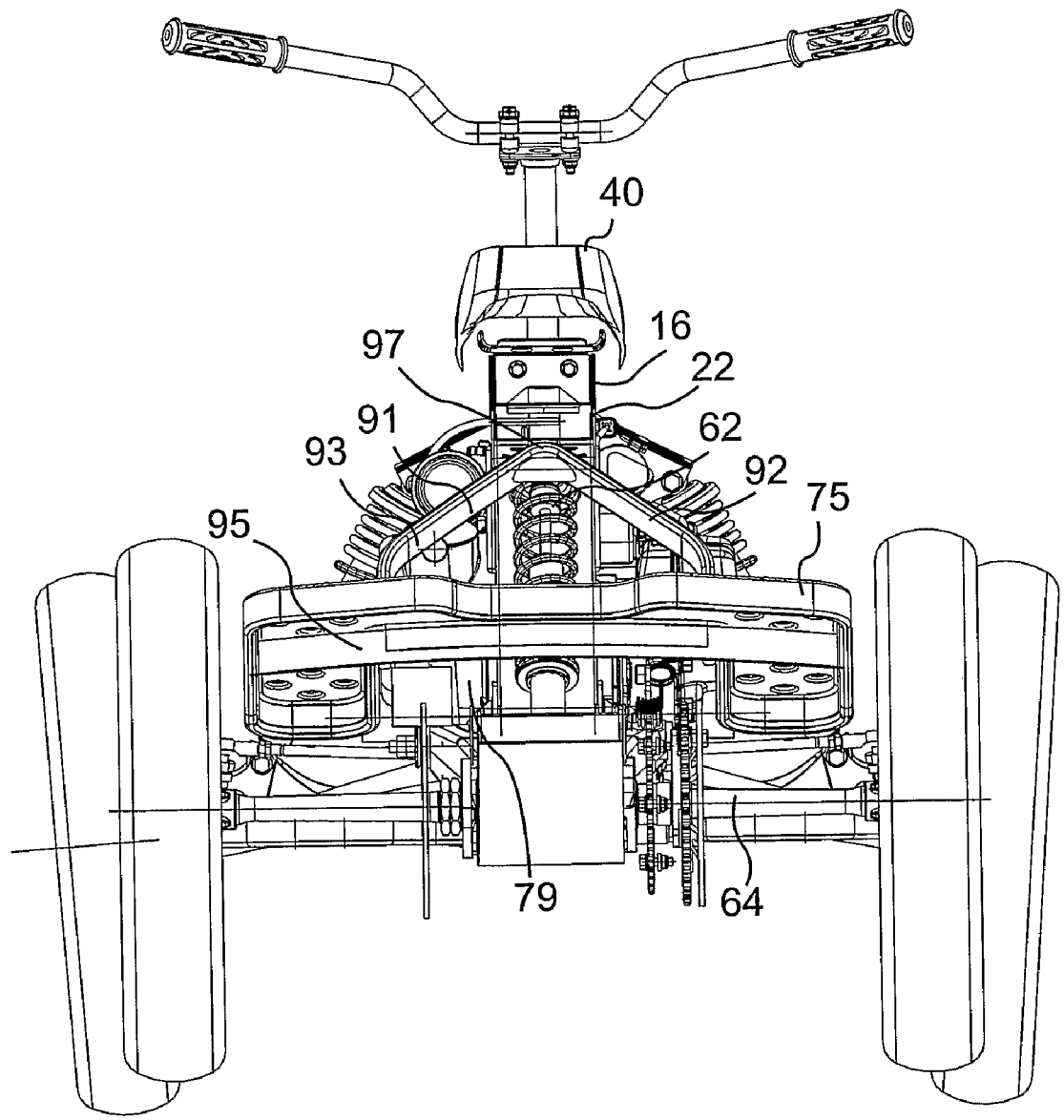
FIG. 9 is a rear elevational view of the all-terrain vehicle illustrated in FIG. 8.

FIGS. 8 and 9 illustrate yet another embodiment of the ATV 10 in which rear platform 75 is provided and is rigidly mounted to the cross member 22 of frame 12 via a rigid triangular frame structure 91 having a pair of downwardly and laterally extending members 92 and 93 from the frame 12 to rear platform 75. The triangular frame structure 91 is secured to the cross member 22 of frame 12 to prevent any movements of rear platform 75 and to provide solid anchoring of rear platform 75. The triangular frame structure 91 could also be mounted to the upper member 16 of frame 12. Triangular frame structure 91 can be fastened or secured to frame 12 by any suitable means known to those skilled in the art. The left portion 76 of rear platform 75 is connected and secured to the side footrest 42 at attachment point 124 by fasteners or any other means known to those skilled in the art. Similarly, The right portion 77 of rear platform 75 is connected and secured to the side footrest 43 at attachment point 125 by fasteners or any other means known to those skilled in the art. The rigid triangular frame structure 91 combined with the attachment points 124, 125 provide sufficient support for rear platform 75 such that no other attachment to the frame 12 is required. Rear platform 75 is therefore supported at attachment point 97 to the cross member 22 of frame 12 and at attachment points 124, 125 to the side footrests 42, 43. As such, rear platform 75 is part of the suspended mass of the ATV 10 and therefore independent of the movements of the swing arm 60 or of the rigid axle 64. It is also contemplated that attachment points 124 and 125 be hinges and that rear platform 75 be attached to and supported by swing arm 60 such that rear platform 75 is again part of the unsprung mass of ATV 10. Rear platform 75 is preferably provided with a clearance space 79 for the single shock absorber/coil spring assembly 62. In this embodiment, rear platform 75 is raised at a slight angle to prevent any interference with the movements of the swing arm 60 and rigid axle 64. Rear platform 75 may also be configured with a frontal lower level and a rear upper level positioned over the rigid axle 64 to prevent interference with the movements of the swing arm 60 and rigid axle 64. As shown in FIG. 10, fenders covering the upper portions of rear wheel assemblies 28, 29 and the side portions of rear wheel assemblies 28, 29 may be connected to rear platform 75 to prevent any contact between the feet or legs of the rider or passenger and the rear wheel assemblies 28, 29. In this embodiment, rear platform 75 if perforated to increase foot grip therewith, or can have a gripping surface applied thereto for the same purpose.

FIG. 10 illustrates yet another embodiment of the ATV 10 comprising a rear platform 100 which is integral with the side footrests 102, 104. In this embodiment, rear platform 100 extends between the rear wheel assemblies 28, 29, and over a substantial portion of the rigid axle 64, and extends in the forward direction to merge with the side footrests 102, 104 to form a single unit or unitary platform extending along the sides and rear of ATV 10. Rear fenders 106 and 108 are mounted to the sides of rear platform 100. Rear fenders 106 and 108 cover the upper portions of rear wheel assemblies 28, 29 and the side portions of rear wheel assemblies 28, 29 to prevent any contact between the feet or legs of the rider or passenger and the rear wheel assemblies 28, 29. Platform 100 is secured to the upper member 16 (or to cross member 22) of frame 12 via a pair of supporting members 112 and 114 extending downwardly and laterally to rear platform 75 where they are rigidly fastened. The side footrests 102, 104 are rigidly fastened onto the lower member 18 of frame 12. Platform 100 is part of the suspended structure of ATV 10 and is therefore independent of the movements of the rear suspension. A raised foot stand 116 extends rearwardly from the central portion of platform 100 at an angle to provide a secure stand for one foot directly over the centerline of the ATV 10. Raised foot stand 116 also provides added leverage as it is positioned at the most rearward point of the platform 100.

The embodiment of the ATV 10 illustrated in FIG. 10, comprises a first rear passageway P1 defined in part by the space between seat 40 and rear left wheel assembly 28 and a second rear passageway P2 defined in part by the space between seat 40 and rear right wheel assembly 29. The first and second rear passageway P1 and P2 provide the rider or passenger with access to seat 40 from the rear of ATV 10. There are also two standard passageways P3 and P4 between the front wheel assemblies 25, 26 and the rear wheel assemblies 28, 29 in which the rider or passenger may access seat 40 from the sides of ATV 10. Third passageway P3 is defined by the space between the rear right wheel assembly 29, the front right wheel assembly 25 and the side footrest 102. Fourth passageway P4 is defined by the space between the rear left wheel assembly 28, the front left wheel assembly 26 and the side footrest 104. The embodiment of ATV 10 as illustrated in FIG. 10 provides a continuous platform 100 which also defines passageways to seat 40 from the left, the right and the rear of the ATV 10. The rider or passenger may step on the platform 100 from either sides of the ATV 10 or from the rear of ATV 10 and easily straddle seat 40. As best shown in FIG. 2, passageway P4 connects to passageway P1, which connects to passageway P2, which connects to passageway P3 thereby creating a continuous passageway P5 extending from one side of ATV 10 to the other side of ATV 10, passing behind the seat 40. The lower limit of the continuous passageway P5 defined by the footrest 42, rear platform 75 and foot rest 43 is always below the height of the wheel assemblies thus allowing the rider or passenger to easily displace himself from one side of the ATV 10 to the other side of ATV 10. As well, in the embodiment illustrated in FIG. 10, the lower limit of the continuous passageway P5 defined by the footrest 104, platform 100 and footrest 102 is always below the height of the wheel assemblies thus allowing the rider or passenger to easily displace himself from one side of the ATV 10 to the other side of ATV 10.

As illustrated in FIG. 10, rear wheel assemblies 28, 29 of ATV 10 are connected through a rigid axle 64 supported by an axle bearing carrier 66 itself attached directly to the end of swing arm 60 and an integral part thereof. Rigid axle 64 includes a rigidly mounted sprocket 70 operatively connected to transmission 15 through an endless chain 72 whereby power is transmitted to the left and right rear wheel assemblies 28, 29. Preferably, endless chain 72 and sprocket 70 are separated from the driver or passenger's leg and feet with a side and rear cover 128 to prevent any contact between the feet or legs of the driver or passenger with the endless chain 72 and sprocket 70. At least a portion of chain 72 and sprocket 70 are located below platform 100.

The rear platform 75 or 100 may be designed to have a surface that prevents slippage or covered with anti-slip material. Furthermore, rear platform 75 or 100 may comprise foot stoppers such as ridges strategically positioned on their surfaces to prevent slippage and/or to establish the limits of the rear platform 75 or 100.

Figure 11:
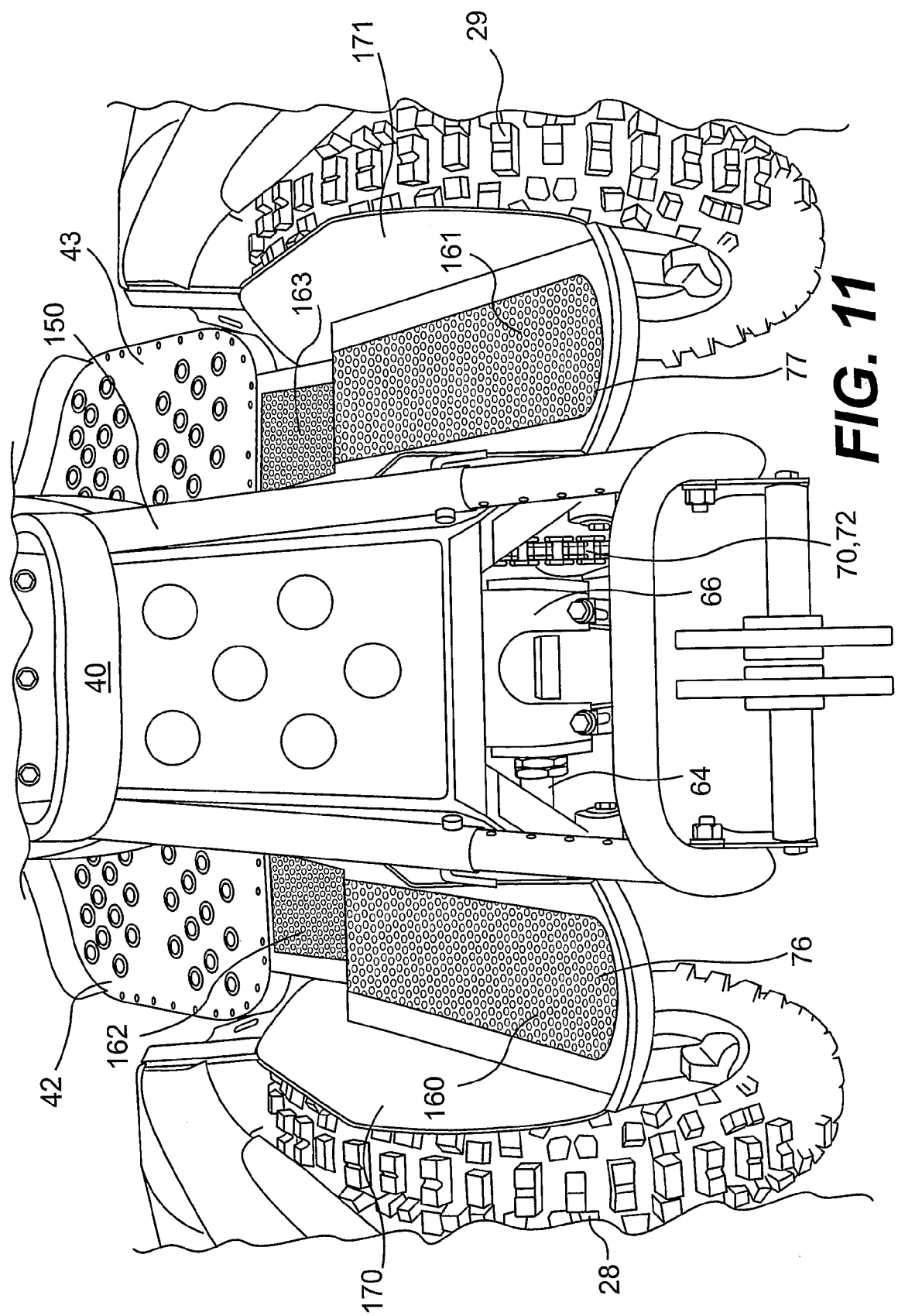
FIG. 11 is a rear partial perspective view of the all-terrain vehicle in accordance with a fifth embodiment of the invention.
Figure 12:
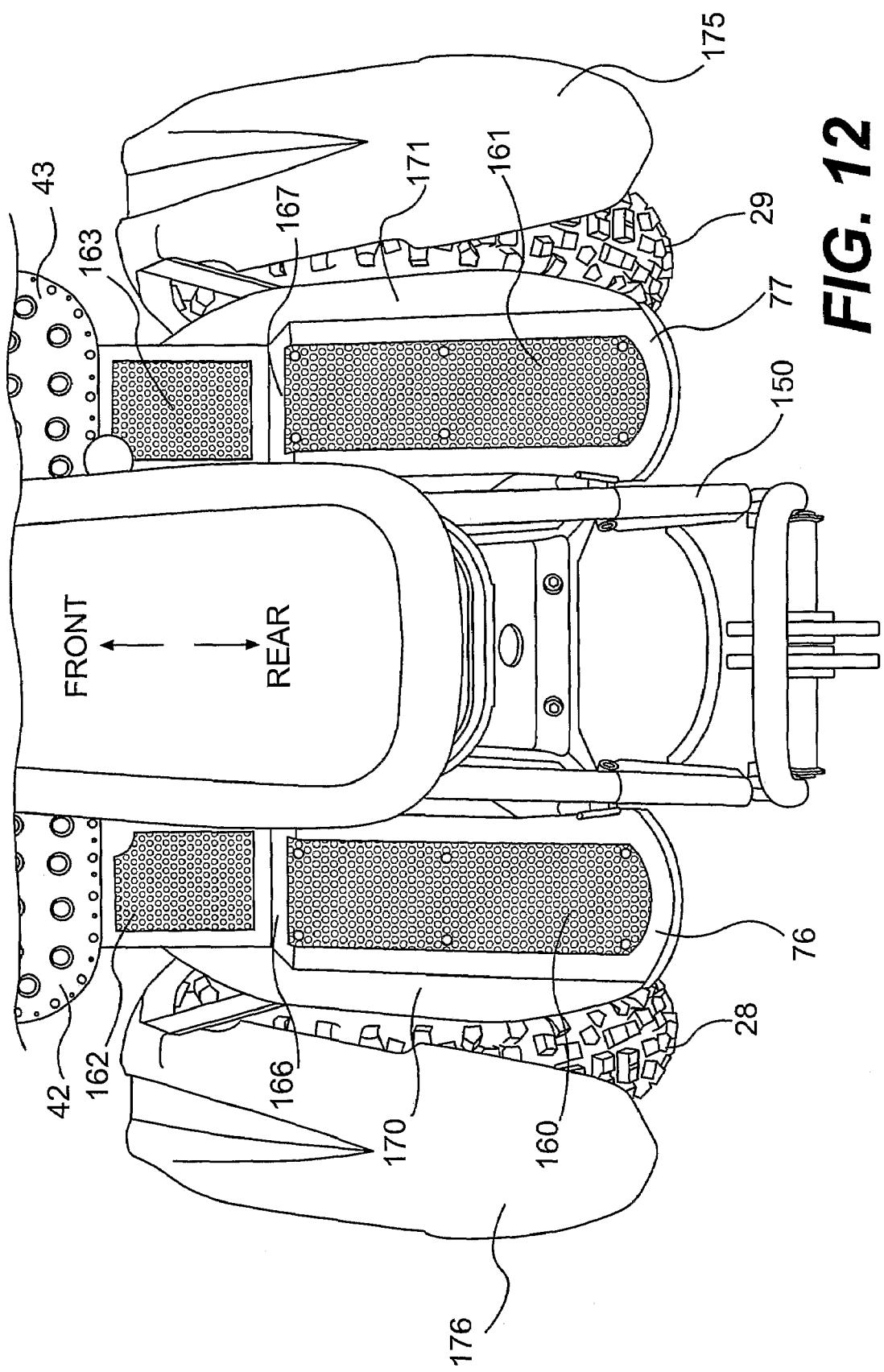
FIG. 12 is a partial top plan view of the rear portion of the all-terrain vehicle show in FIG. 11.
Figure 13:
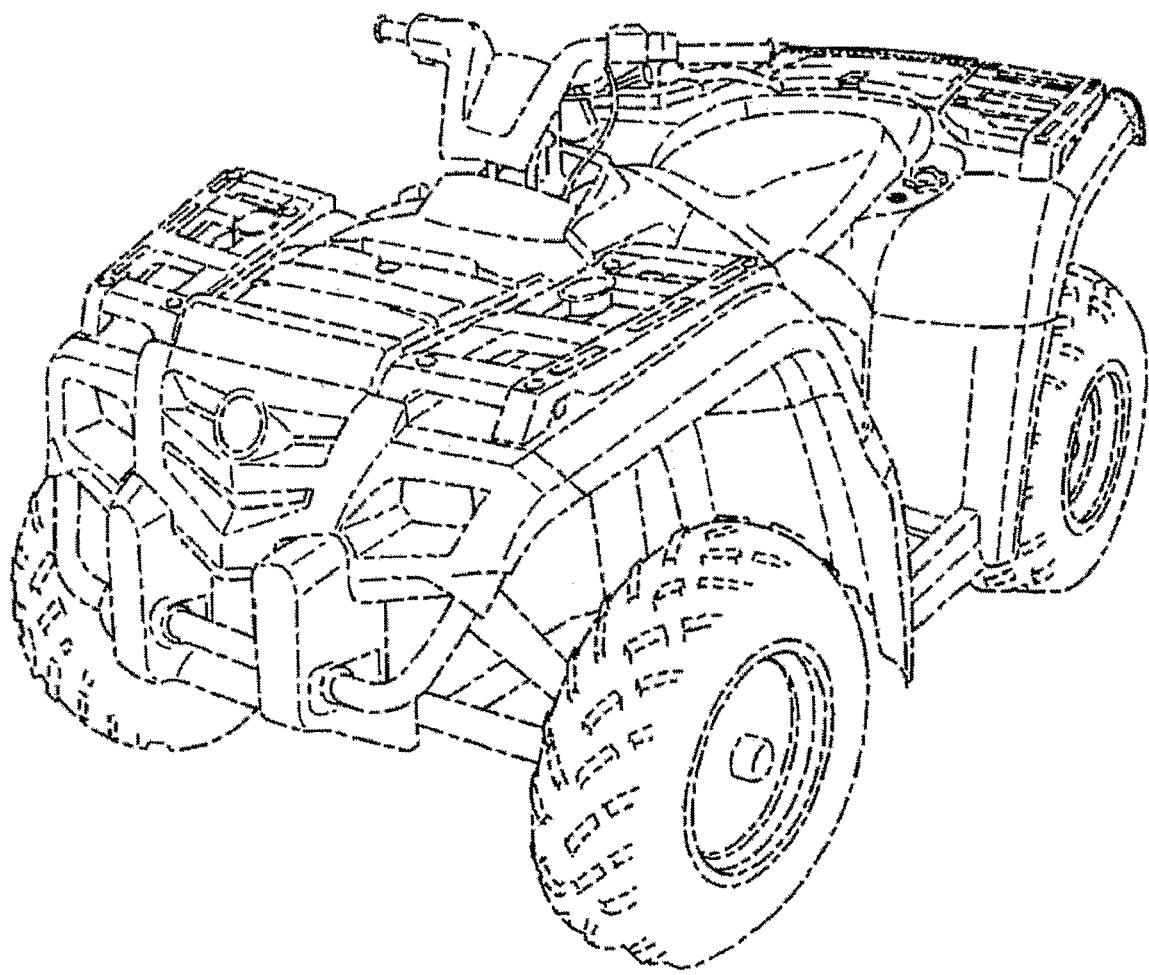
FIG. 13 is a front perspective view of a prior art all-terrain vehicle.
Figure 14:
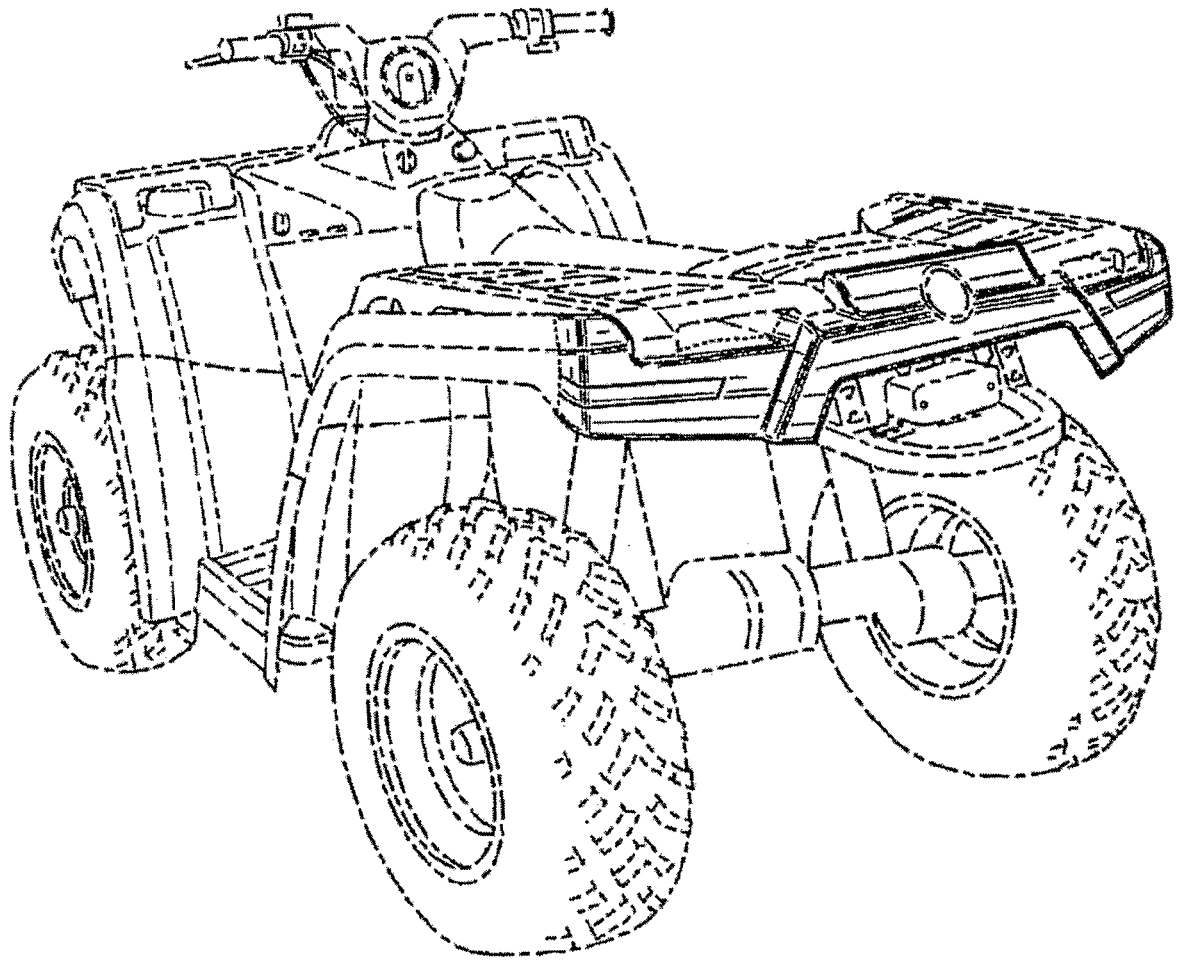
FIG. 14 is a rear perspective view of a prior art all-terrain vehicle.

FIGS. 11 and 12 illustrate yet another embodiment of the ATV 10 including a rear frame structure 150 extending to the rearwardmost portion of the vehicle 10 and covering a portion of the rigid axle 64, the axle bearing carrier 66 and the sprocket 70 and chain 72. In this particular embodiment, the rear platform comprises a left portion 76 and a right portion 77 distinct from each other and separated by the rear frame structure 150. Left and right portions 76 and 77 are connected and supported by the rear frame structure 150 and are therefore part of the suspended mass of the vehicle moving independently from the rear suspension. Left and right portions 76 and 77 include upper level sections 160, 161 and lower level sections 162, 163 respectively connected by drops 166, 167. The upper level sections 160, 161 providing sufficient clearance to accommodate the up and down movements of the rear suspension and more specifically to prevent interference with rigid axle 64. The lower level sections 162, 163 extend in front and below upper level sections 160, 161 to abut against the side footrests 42, 43 respectively thereby forming two continuous passageways extending from the rear of the ATV 10 all the way to the front wheel assemblies (not shown). Left and right portions 76 and 77 each include feet guards 170, 171 directly connected to the outer sides of each left and right platform portions 76 and 77 separating the feet of the rider or passenger from the rear wheel assemblies 28, 29 and preventing contact between the feet of the rider or passenger from the rear wheel assemblies 28, 29. Fenders 175, 176 are also provided to cover at least a portion of the circumference of rear wheel assemblies 28, 29 to prevent contact between the feet of the rider or passenger from the rear wheel assemblies 28, 29 and to prevent ingress of dirt and debris pick up by the tires. Fenders 175, 176 are mounted directly onto the feet guards 170, 171 and therefore follow the movement of the left and right portions 76 and 77 of the platform.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An all-terrain vehicle comprising:
 a frame having a front portion, a rear portion, an upper portion and a lower portion;
 an engine supported by the frame;
 a front left wheel and a front right wheel, each having a center, a line drawn through the centers of the front wheels defining a front wheel axis, each of the front left wheel and the front right wheel connected to the front portion of the frame via a front suspension;
 a rear left wheel and a rear right wheel each having a tire and a center, a line drawn through the centers of the rear wheels defining a rear wheel axis, each of the rear wheels connected to the rear portion of the frame via a rear suspension; each of the rear wheels having a height defined by a diameter of the wheels including its tire;
 at least one of the wheels being operatively connected to the engine;
 a steering assembly supported by the frame and operatively connected to the front left wheel and the front right wheel;
 a straddle seat disposed on the frame, the seat dimensioned to accommodate a driver thereon in a seating position forward of the rear wheel axis of the vehicle, and at least one rear platform extending over at least a portion of the rear wheel axis between the rear left wheel and the rear right wheel, the at least one rear platform being positioned on the ATV, at least in part, below the height of the rear wheels, the at least one rear platform defining a standing position behind the seating position.

2. An all-terrain vehicle as defined in claim 1, wherein the at least one rear platform comprises a left portion extending along the rear left wheel and a right portion extending along the rear right wheel, the left portion and the right portion defining a clearance gap therebetween to accommodate mechanical components of the vehicle.

3. An all-terrain vehicle as defined in claim 2, wherein the at least one rear platform further comprises a central portion connecting the left portion and the right portion of the at least one rear platform.

4. An all-terrain vehicle as defined in claim 3, wherein the at least one rear platform is a unitary platform comprising the central portion, the left portion and the right portion joined together.

5. An all-terrain vehicle as defined in claim 1, wherein the at least one rear platform extends behind the rear wheel axis.

6. An all-terrain vehicle as defined in claim 1, wherein the at least one rear platform is mounted to the frame and is part of a suspended mass of the all-terrain vehicle.

7. An all-terrain vehicle as defined in claim 1, wherein the at least one rear platform is mounted to the rear suspension and is part of an unsprung mass of the all-terrain vehicle.

8. An all-terrain vehicle as defined in claim 1, wherein the at least one rear platform has a forward portion and a rearward portion, the rearward portion of the at least one rear platform being higher than the forward portion of the at least one rear platform.

9. An all-terrain vehicle as defined in claim 8, wherein the at least one rear platform extends rearwardly and upwardly at an angle.

10. An all-terrain vehicle as defined in claim 1, further comprising rear wheel fenders connected to the at least one rear platform, the rear wheel fenders covering at least partially an inner side of each rear wheel to prevent contact between the feet of a rider and the rear wheels.

11. An all-terrain vehicle as defined in claim 1, further comprising a raised foot stand extending from and above the at least one rear platform.

12. An all-terrain vehicle as defined in claim 1, further comprising a left and a right footrest, each footrest positioned between the front wheel axis and the rear wheel axis, wherein the at least one rear platform extends forwardly towards at least one of the footrests, a forward end of the at least one rear platform being adjacent to at least one of the footrests.

13. An all-terrain vehicle as defined in claim 2, further comprising a left and right footrest, each footrest positioned between the front wheel axis and the rear wheel axis, wherein the left portion of the at least one rear platform is joined to the left side footrest and the right portion of the at least one rear platform is joined to the right side footrest.

14. An all-terrain vehicle as defined in claim 4, further comprising a left and right footrest, each footrest positioned between the front wheel axis and the rear wheel axis, wherein the left portion of the at least one rear platform is joined to the left side footrest and the right portion of the at least one rear platform is joined to the right side footrest thereby forming a unitary platform.

15. An all-terrain vehicle as defined in claim 1, wherein the rear wheels comprise tires narrower than 18 cm in width.

* * * * *